(12) United States Patent
Hill (10) Patent No.: US 7,854,357 B2
(45) Date of Patent: Dec. 21, 2010

(54) DISPENSING APPARATUS WITH LOCKING CAP

(75) Inventor: Sheila Hill, Portsmouth (GB)

(73) Assignee: OMS Investments, Inc., Los Angeles, CA (US)

( * ) Notice: Subject to any disclaimer, the term of this patent is extended or adjusted under 35 U.S.C. 154(b) by 762 days.

(21) Appl. No.: 11/173,430

(22) Filed: Jul. 1, 2005

(65) Prior Publication Data

US 2007/0000954 A1    Jan. 4, 2007

(51) Int. Cl.
    *B65D 25/48*    (2006.01)
(52) U.S. Cl. .................... 222/475; 222/465.1; 222/466; 222/531; 222/533
(58) Field of Classification Search .............. 222/475, 222/531, 533, 534, 536, 465.1, 466, 469, 222/470, 530, 538, 566, 567, 196.1, 196.2; 220/315; 215/235–237
    See application file for complete search history.

(56) References Cited

U.S. PATENT DOCUMENTS

| | | | |
|---|---|---|---|
| 1,264,503 A | | 4/1918 | Griffin |
| 1,544,503 A | * | 6/1925 | Thomson .................... 222/475 |
| 1,595,231 A | | 8/1926 | Dryer |
| 1,631,951 A | | 6/1927 | McAnsh |
| 2,673,664 A | * | 3/1954 | Boysen ...................... 222/469 |
| 3,185,358 A | * | 5/1965 | Marler ....................... 222/475 |
| 3,233,783 A | * | 2/1966 | Thornton .................... 222/83 |
| 3,372,846 A | | 3/1968 | Berkus |
| 3,401,840 A | * | 9/1968 | McConnell et al. ......... 222/158 |
| 3,655,099 A | * | 4/1972 | Hazard .................... 222/153.06 |
| 4,291,814 A | | 9/1981 | Conn |
| 4,664,301 A | * | 5/1987 | Hoyt .......................... 222/538 |
| 4,811,870 A | * | 3/1989 | Bianco ....................... 222/461 |
| 5,203,468 A | | 4/1993 | Hsu |
| 5,205,424 A | * | 4/1993 | Gaspar ....................... 215/210 |
| 5,277,343 A | * | 1/1994 | Parsonage ................... 222/484 |
| 5,346,081 A | | 9/1994 | Lin |
| 5,388,712 A | | 2/1995 | Brody |
| 5,890,628 A | * | 4/1999 | Simpson et al. ............. 222/131 |
| 5,996,858 A | | 12/1999 | Tapp et al. |

(Continued)

FOREIGN PATENT DOCUMENTS

EP    677401    8/1952

(Continued)

OTHER PUBLICATIONS

International Search Report and Written Opinion for International Application No. PCT/US06/26119, mailed Jan. 5, 2007.

(Continued)

*Primary Examiner*—Frederick C. Nicolas
(74) *Attorney, Agent, or Firm*—Hunton & Williams LLP (57) ABSTRACT

A dispensing apparatus having a container, a rotatable dispensing structure or spout assembly and a locking structure or cap. The spout assembly is rotatable between a closed position and an open dispensing position and the locking cap is slideable between a spout assembly restraining position and a release position. The container includes a pair of side grooves, a pair of side ledges and a lateral groove. The locking cap includes a pair of runners for engaging the container side grooves, a pair of rails for engaging the container side ledges and a lateral flange for engaging the container lateral groove.

18 Claims, 7 Drawing Sheets

U.S. PATENT DOCUMENTS 6,279,773 B1  8/2001  Kiyota

FOREIGN PATENT DOCUMENTS

| EP | 798158  | 7/1958  |
|----|---------|---------|
| EP | 1305055 | 1/1973  |
| EP | 1602199 | 11/1981 |
| EP | 0591601 | 4/1994  |
| FR | 2708569 | 8/1993  |
| GB | 2286109 | 8/1995  |

OTHER PUBLICATIONS

Supplemental European Search Report and Written Opinion for European Application No. EP 06 77 4502, mailed Jul. 23, 2009.

* cited by examiner

DISPENSING APPARATUS WITH LOCKING CAP

CROSS REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a dispensing apparatus and more particular to a dispensing apparatus having a dispensing assembly and a slidable locking cap for restraining the dispensing assembly in a closed position.

2Description of the Related Art

Dispensing devices, especially those for lawn care products such as a combination of lawn fertilizer and weed control, are known, as exemplified by U.S. Pat. No. 5,996,858. Lawn products are often particulate or granular, but may be liquid, and these are spread by a consumer holding the device in an open condition while walking at a prescribed rate along a predetermined path. These devices have rotatable spouts fitted to a plastic molded container having an integral handle. Some have covers, other breakaway tabs and some have both.

The lawn product must be handled in a recommended manner and the dispensing devices ought to be tightly closed and kept in a safe place. Cost, ease of use and reliable structure are also of concern when designing such dispensing devices.

BRIEF SUMMARY OF THE INVENTION

What is described here is a dispensing apparatus including a container having an opening, a dispensing structure connected to the container at the opening with the dispensing structure being movable between a closed position and an open, dispensing position, and a locking structure mounted to the container and selectively slidable between a restraining position and a release position.

A complete understanding of the present invention and other objects, advantages and features thereof will be gained from a consideration of the present specification which provides a written description of the invention, and of the manner and process of making and using the invention, set forth in such full, clear, concise, and exact terms as to enable any person skilled in the art to which it pertains, or with which it is most nearly connected, to make and use the same in compliance with Title 35 U.S.C. section 112 (first paragraph). Furthermore, the following description of a preferred embodiment of the invention read in conjunction with the accompanying drawing provided herein represent an example of the invention in compliance with Title 35 U.S.C. section 112 (first paragraph), but the invention itself is defined in the Claims section attached hereto.

DETAILED DESCRIPTION OF A PREFERRED EMBODIMENT OF THE INVENTION

While the present invention is open to various modifications and alternative constructions, the preferred embodiment illustrating the best mode contemplated by the inventors of carrying out their invention is shown in the various figures of the drawing and will be described herein in detail, pursuant to Title 35 U.S.C. section 112 (first paragraph). It is understood, however, that there is no intention to limit the invention to the particular embodiment, form or example which is disclosed herein. To the contrary, the intention is to cover all modifications, equivalent structures and methods, and alternative constructions falling within the spirit and scope of the invention as expressed in the appended Claims section attached hereto, pursuant to Title 35 U.S.C. section 112 (second paragraph).

Figure 1:
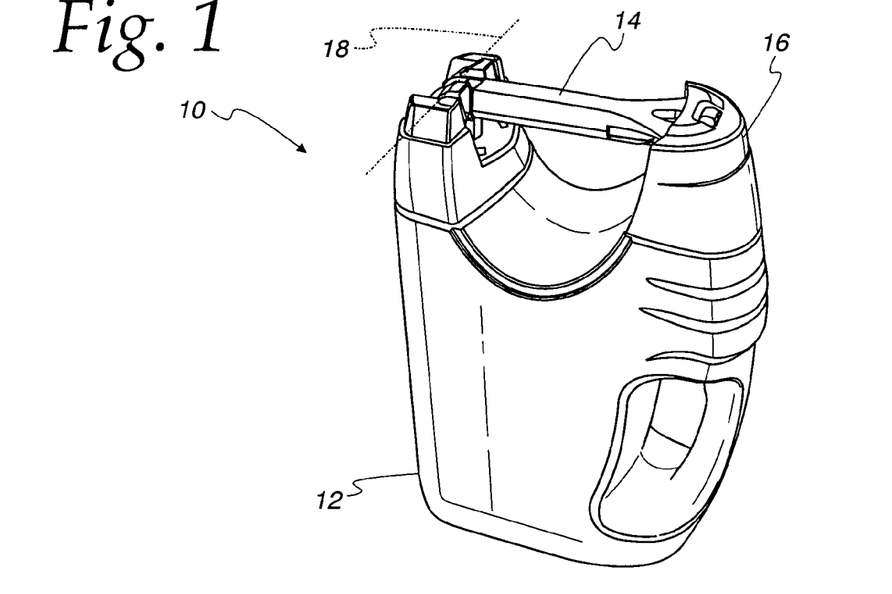
FIG. 1 is a downwardly looking isometric view of a dispensing apparatus of the present invention in a closed position, the dispensing apparatus including a container, a dispensing structure and a locking structure.
Figure 2:
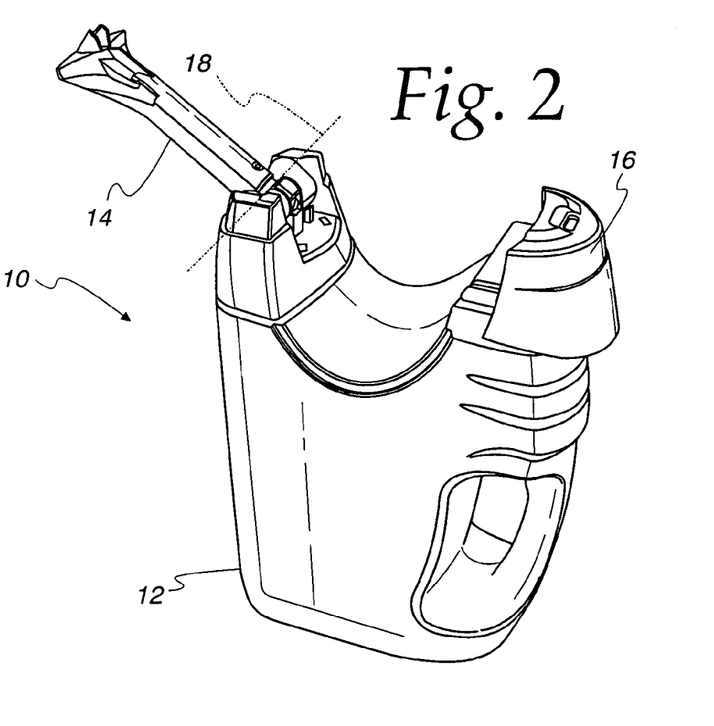
FIG. 2 is an isometric view of the dispensing apparatus shown in FIG. 1 in an open dispensing position.
Figure 3:
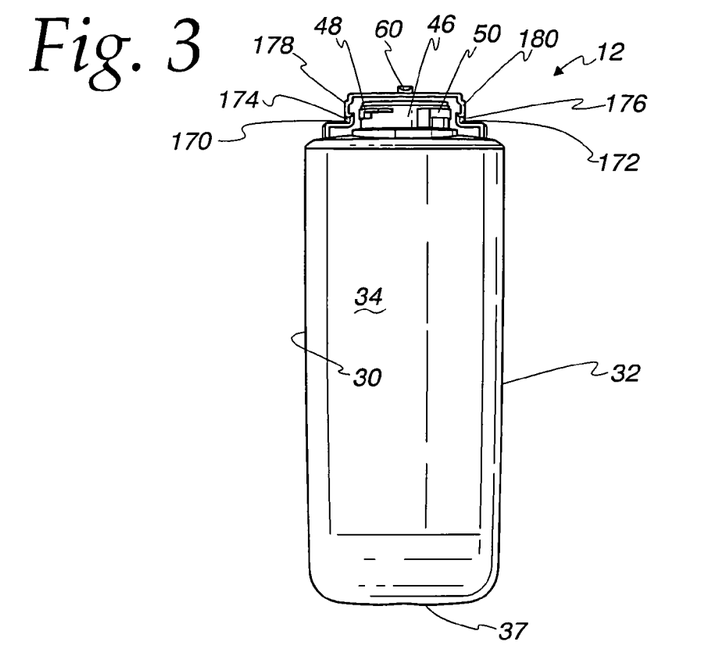
FIG. 3 is a front elevation view of the container of the dispensing apparatus shown in FIGS. 1 and 2.
Figure 4:
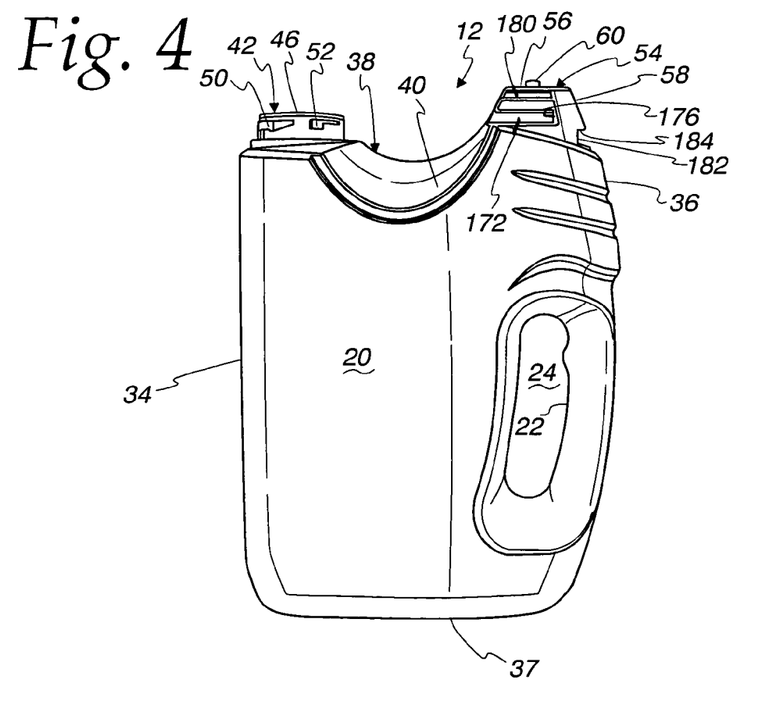
FIG. 4 is a side elevation view of the container shown in FIG. 3.
Figure 5:
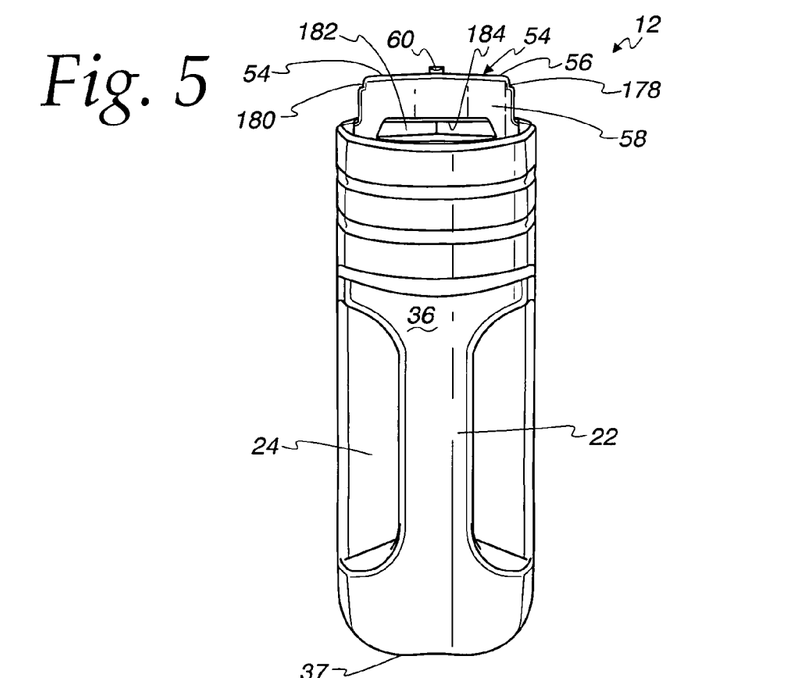
FIG. 5 is a rear elevation view of the container shown in FIGS. 3-4.
Figure 6:
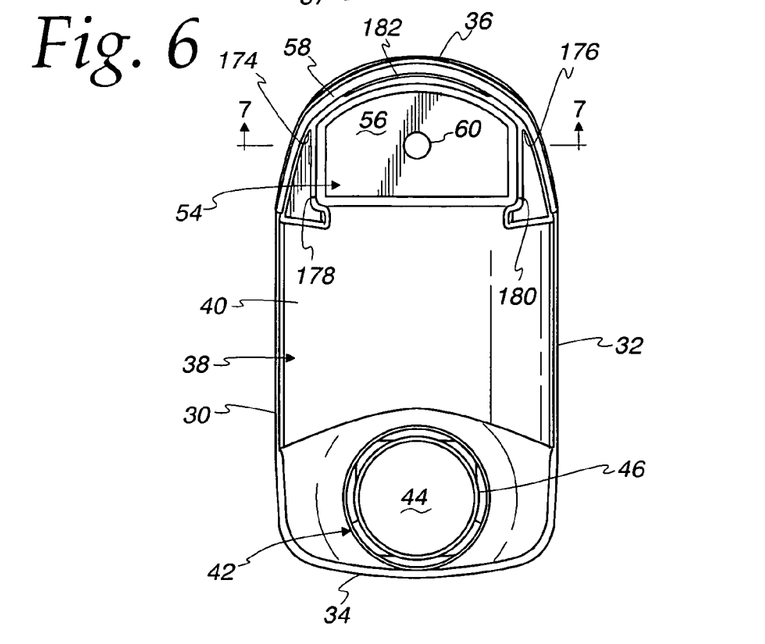
FIG. 6 is a top plan view of the container shown in FIGS. 3—5.
Figure 7:
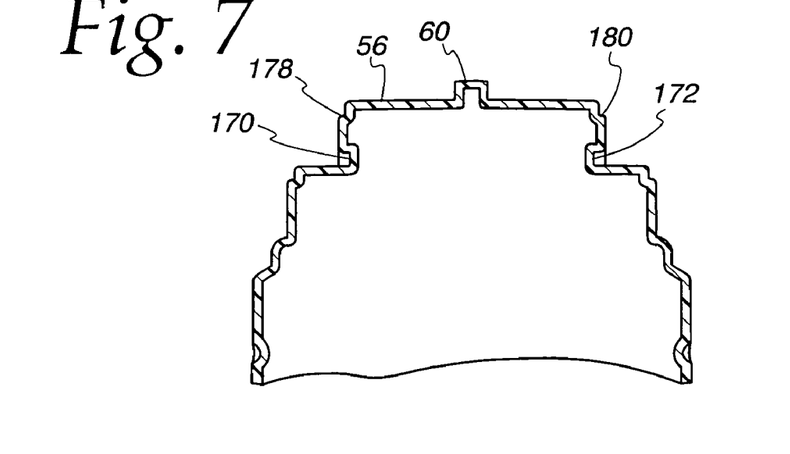
FIG. 7 is a sectional view taken along line 7—7 of FIG. 6.
Figures 8, 9:
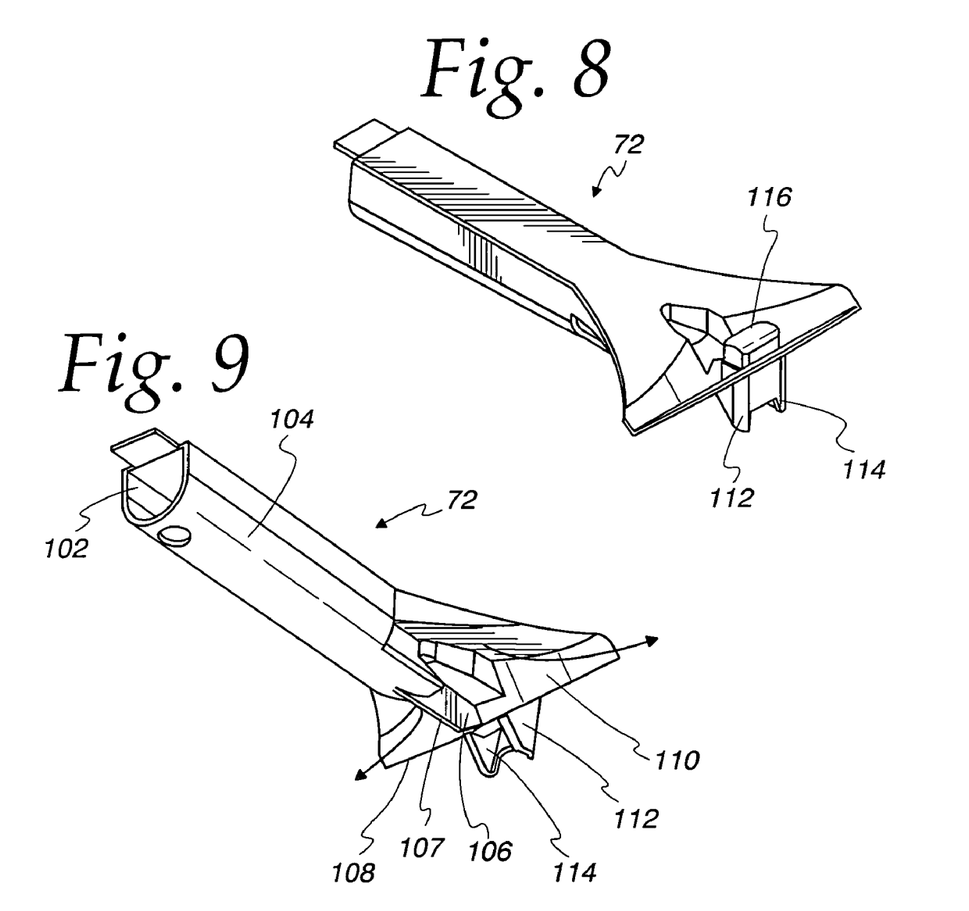
FIG. 8 is a downwardly looking isometric view of a duct of the dispensing structure.
FIG. 9 is an upward looking isometric view of the duct shown in FIG.8.
Figure 10:
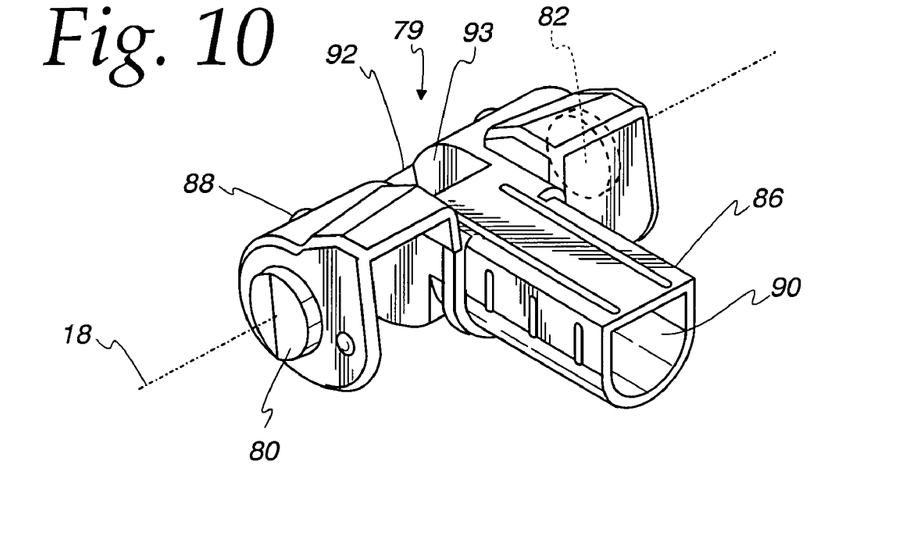
FIG. 10 is an isometric view of an axle of the dispensing structure.
Figure 11:
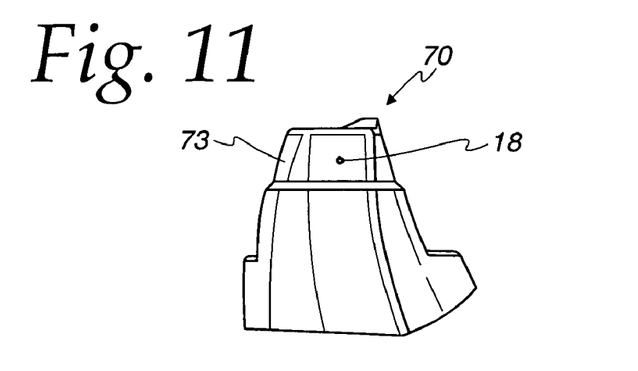
FIG. 11 is a side elevation view of a collar of the dispensing structure.
Figure 12:
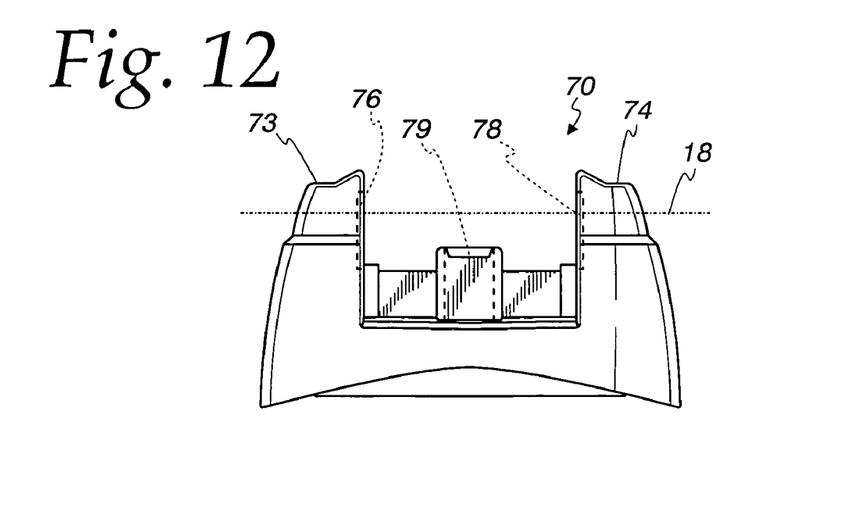
FIG. 12 is a front elevation view of the collar.
Figure 13:
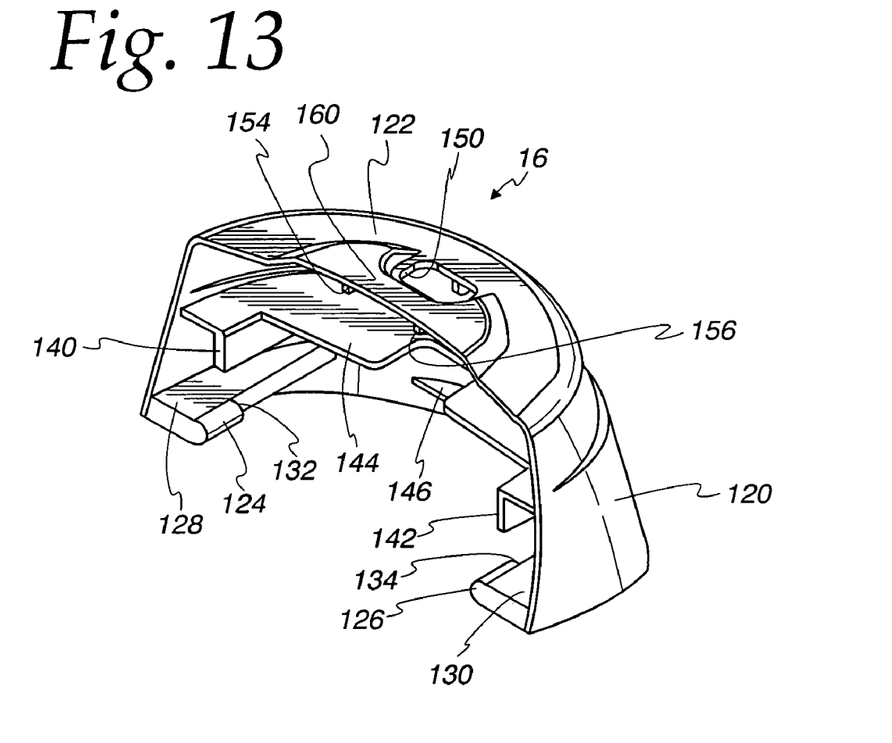
FIG. 13 is a rear isometric view of the locking structure shown in FIGS. 1-2.
Figure 14:
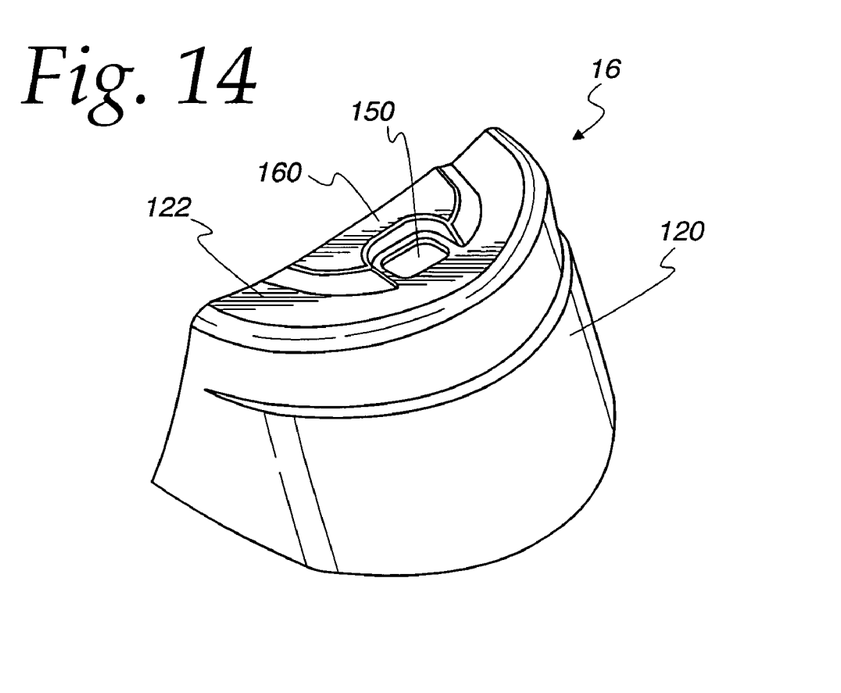
FIG. 14 is a front isometric view of the locking structure.
Figure 15:
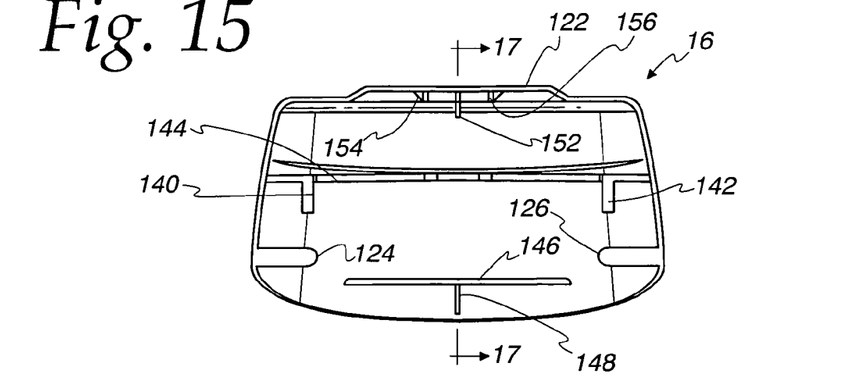
FIG. 15 is a rear elevation view of the locking structure.
Figure 16:
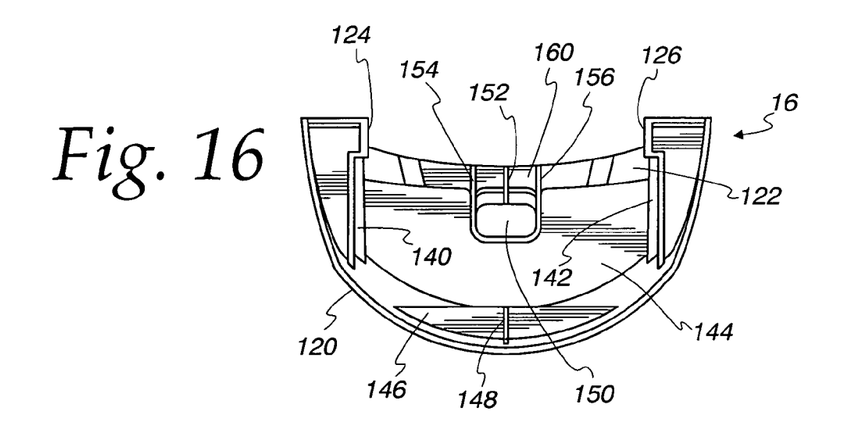
FIG. 16 is a bottom plan view of the locking structure.
Figure 17:
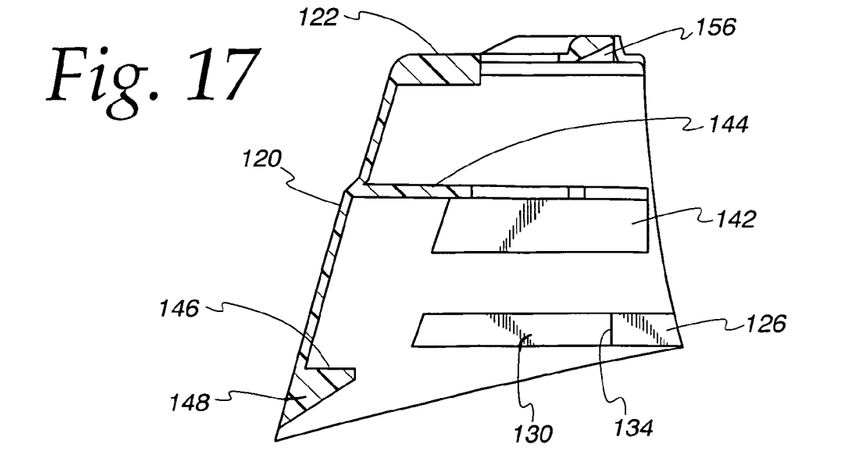
FIG. 17 is a sectional view taken along line 17—17 of FIG. 15.

The dispensing apparatus 10 of the present invention is shown in FIGS. 1 and 2 and includes a container or bottle 12, a dispensing structure or spout assembly 14 and a locking structure or cap or sleeve 16. The dispensing apparatus 10 may be particularly useful for lawn care products, such as particulate or granular products including fertilizers and weed control agents and the like and combinations thereof. The dispensing structure or spout assembly 14 of the dispensing apparatus rotates or pivots about a generally horizontal axis 18 between a closed position shown in FIG. 1 and an open, dispensing position shown in FIG. 2. The locking cap or sleeve 16 is slidable between two positions, a spout assembly restraining position shown in FIG. 1 and a spout assembly release position shown in FIG. 2. When the locking structure or cap is in its restraining position, the spout structure or assembly is secured in its closed position best illustrated in FIG. 1. When the locking cap is moved to its release position, best illustrated in FIG. 2, the dispensing structure is freed to be rotated about the axis 18 from its closed position to its open, dispensing position.

The dispensing apparatus 10 is simply constructed, robust, relatively inexpensive and reliable in operation and is easily manipulated by a consumer. The dispensing apparatus is resealable so that the contents of the container may be partially dispensed and then the dispensing apparatus may be closed for storage and later use. Another advantage of the inventive dispensing apparatus is that when the spout assembly is in a closed position and the locking cap is in a restraining position as shown in FIG. 1, the spout assembly may be used as a handle for transporting the dispensing apparatus.

Referring now to FIGS. 3-7, the container or bottle 12 is illustrated in more detail. The container may be molded in two pieces of a suitable plastic material well known to those skilled in the art. The container may include a main body 20 and an integral handle 22. The handle is formed by molding a hand opening 24 near the rear portion of the container 12. The container includes opposing side walls 30, 32, a front wall 34, a rear wall 36, a bottom wall 37 and a top portion 38 which has three sub-portions or sections. A middle wall section 40 of the top portion is curved, a front section 42 of the top portion includes an opening 44 to the interior of the container and a cylindrical rim 46 with bayonet type projections 48, 50, 52 and a rear section 54 of the top portion forming a locking cap mount having a flat top surface 56 and a curved side surface 58. Positioned in approximately the center of the rear section 54 of the top portion 38 is a cylindrically shaped projection 60. It is to be noted that the container may be designed in many different forms and shapes without departing from the invention herein.

The spout structure or assembly 14 is shown in more detail in FIGS. 8-12. The spout assembly may include a collar 70, an axle structure 71 and a duct 72. The collar 70 may have internal projections (not shown) for engaging the bayonet projections 48, 50, 52, FIGS. 3 and 4, on the rim 46 of the container 12, and opposing towers 73, 74 with opposing openings 76, 78. The collar may also include a passageway 79. Mounted in the openings 76, 78 are trunnions 80, 82 of the axle structure 71. The axle structure is rotatable about the axis 18 and also includes a connector tube 86, and a curved body portion 88. The connector tube 86 includes a passageway 90 which ends at an internal wall 92 of the body portion 88. The wall 92 helps define a passageway 93 in the body portion 88.

The spout structure or assembly may also include the duct 72 having a central passageway 102, an outer wall portion 104, a central wall portion 106 with an abutment surface or edge 107, a pair of diverter walls 108, 110, a pair of guide flanges 112, 114 and a top projection 116. The passageway 79 of the collar 70 communicates with the interior of the container 12 and the passageways 90, 93 in the axle structure 71. The connector tube 86 of the axle structure 71 is received by the duct 72 so that the duct passageway 102 also comes into communication with the axle passageways 90, 93. When the spout assembly is in the open, dispensing position shown in FIG. 2, the passageways 79, 90, 93, 102 are in communication with each other and with the interior of the container. This arrangement allows product in the container to be fed through the passageways 79, 90, 93, 102 to the diverter walls 108, 110 as a product user walks along a predetermined path at a prescribed rate while holding the dispensing apparatus in a position rotated about 90 degrees from the position shown in FIG. 2.

When the spout assembly is in a closed position as shown in FIG. 1, the internal wall 92 of the axle 71 blocks the passageway 79 in the collar 70 to prevent the flow of product out of the container. It is to be noted that the spout structure or assembly may be designed in many different forms without departing from the invention herein.

The locking structure or cap 16 is shown in more detail in FIGS. 13-17. The locking cap may be made of a one-piece molded part formed of a flexible material such as PP random copolymer having a wall thickness of about 1.5 mm. The locking cap 16 includes a generally circular side wall 120, a top wall 122, a pair of first side structures or runners 124, 126 integral with a pair of side flanges 128, 130, the runners having a pair of end walls 132, 134. The locking cap may also include a second pair of side structures or rails 140, 142 integral with a middle flange 144. The locking cap may also include a lateral rear structure or flange 146 with a brace 148, a hole 150 in the top wall 122 adjacent a ramp flange 152, and two guide flanges 154, 156.

The top wall hole 150 is dimensioned to receive the spout assembly top projection 116. As the locking cap 16 is moved to its locking or restraining position, the spout assembly top projection 116 bears against the ramp flange 152 to flex a lip portion 160 of the top wall 122 upwardly to allow the passage of the top projection 116. The lip portion 160 then snaps downwardly when the top projection 116 and the hole 150 in the top wall 122 of the locking cap are aligned. This secures or locks the spout assembly 14 and the locking cap 16 as shown in FIG. 1. The guide flanges 154, 156 guide the top projection 116 toward the hole 150 in the locking cap.

The rear section 54, FIGS. 3-7, of the container top portion 38 is specially designed to mount the locking cap 16 and to allow the locking cap to slide between its release position shown in FIG. 2 and its restraining position shown in FIG. 1. The container rear section 54 may include a first pair of side structures or grooves 170, 172 which terminate at a pair of abutment walls 174, 176, a second pair of side structures or ledges 178, 180 and a lateral structure or groove 182. The lateral groove 182 is positioned to receive the lateral flange 146, FIGS. 13-17, and brace 148 of the locking cap 16. The side ledges 178, 180 provide surfaces to engage the rails 140, 142 of the locking cap 16 and the side grooves 170, 172 are formed to receive the runners 124, 126 of the locking cap 16. The end walls 132, 134 of the locking cap runners are positioned to engage the abutment walls 174, 176 which terminate the side grooves 170, 172 of the container 12.

The locking cap 16 is sufficiently flexible that installation of the locking cap 16 to the container 12 is easily accomplished by pressing the locking cap onto the rear of the container such that the runners 124, 126 are biased outwardly until the end walls 132, 134 of the locking cap pass the abutment walls 174, 176 of the container. Once the locking cap has passed the abutment walls, the runners 124, 126 snap into the side grooves 170, 172 allowing the locking cap to be positioned on the container as shown in FIG. 2. The end walls 132, 134 of the locking cap runners 124, 126 and the abutment walls 174, 176 of the container 12 now provide a limit to sliding rearward movement of the locking cap relative to the container. At the same time, the rails 140, 142 of the locking cap are aligned to slide on the ledges 178, 180 of the container, and when the locking cap 16 is moved forwardly, the lateral flange 146 and the brace 148 are able to slide under a top wall 184 of the lateral groove 182 of the container. It is to be noted that the runners and rails of the locking structure and the grooves and ledges of the container may be designed differently without departing from the invention herein.

The spout assembly 14 is installed onto the container 12 by aligning the projections on the collar 70 with the bayonet projections 48, 50, 52 on the rim 46 surrounding the opening 44 of the container 12. By rotating the spout assembly through an angle of about 45 degrees, the collar engages around the rim of the container to attach the spout assembly as shown in FIGS. 1 and 2.

After being filled with product, the dispensing container 10 may be shipped to a retail establishment in the configuration shown in FIG. 1. At the retail establishment, the dispensing apparatus is displayed for sale but is otherwise maintained in the closed condition. After purchase by a consumer, the dispensing apparatus may be maintained in a closed condition until the consumer desires to dispense the product on his/her lawn. Operation of the dispensing apparatus is simple and easily performed. The spout assembly is pressed downwardly with one hand so that the abutment edge 107 of the middle wall 106 of the duct 100 abuts the top wall 56 of the container. At the same time, the locking cap is slid rearwardly whereby the top projection 116 of the spout assembly distorts the lip portion 160 of the locking cap allowing the locking cap to be placed in its release position as shown in FIG. 2. The spout assembly is then rotated about the axis 18 to the position shown in FIG. 1. The user grips the handle 22 of the container and tilts the dispensing apparatus to allow gravity to operate on the product within. By rotating the spout assembly, the passageways of the spout assembly are opened to allow the product to be dispensed.

After use, the dispensing apparatus may be resealed simply by returning the dispensing apparatus to an upright position, rotating the spout assembly about axis 18 back to a closed position, holding the duct 72 against the top wall 56 and sliding the locking cap forward causing the top projection 116 of the spout assembly to flex the lip portion 160 of the locking cap until the top projection is received by the hole 150 in the locking cap as is shown in FIG. 1. The dispensing apparatus may now be stored for later use.

The above specification describes in detail a preferred embodiment of the present invention. Other examples, embodiments, modifications and variations will, under both the literal claim language and the doctrine of equivalents, come within the scope of the invention defined by the appended claims. For example, the design and dimensions of the container, the spout structure and the locking structure may be altered, or different materials may be used and these will still be considered equivalent structures and will also come within the literal language of the claims. Still other alternatives will also be equivalent as will many new technologies. There is no desire or intention here to limit in any way the application of the doctrine of equivalents nor to limit or restrict the scope of the invention.

The invention claimed is:

1. A dispensing apparatus comprising:
a container having an opening;
a dispensing structure connected to said container at said opening, said dispensing structure being mounted for movement between a closed position and an open position; and
a locking structure slideably mounted to said container for selective movement between a restraining position and a release position, wherein said locking structure is linearly movable between the restraining position and the release position;
said locking structure in said restraining position contacting said dispensing structure to securely retain said dispensing structure in the closed position, and said dispensing structure forming a handle for said container when said dispensing structure is in the closed position and said locking structure is in the restraining position; and
said locking structure in said release position enabling said dispensing structure to be movable to said open position.

2. The apparatus of claim 1 wherein:
said container includes a pair of side structures; and
said locking structure includes a pair of side structures for sliding engagement with said side structures of said container.

3. The apparatus of claim 2 wherein:
said container includes a pair of abutment surfaces at ends of said pair of container side structures; and
said locking structure includes a pair of abutment surfaces at ends of said locking structure side structures for engaging said container abutment surfaces.

4. The apparatus of claim 2 wherein:
said container includes a second pair of side structures; and
said locking structure includes a pair of abutment surfaces at ends of said locking structure side structures for engaging said container abutment surfaces.

5. The apparatus of claim 1 wherein:
said locking structure includes a hole and a ramp; and
said dispensing structure includes a projection for bearing against said ramp and flexing said locking structure and for being received in said hole of said locking structure for securing said dispensing structure.

6. The apparatus of claim 5 wherein:
said locking structure is formed of flexible material.

7. The apparatus of claim 1 wherein:
said container includes a lateral structure having an upper wall; and
said locking structure includes a lateral flange for sliding adjacent said upper wall of said lateral structure.

8. The apparatus of claim 1 wherein:
said container includes a projection; and
said dispensing structure includes guide flanges.

9. The apparatus of claim 1 wherein:
said dispensing structure includes an abutment surface; and
said container includes an abutment surface for engaging said abutment surface of said dispensing structure when said dispensing structure is in the closed position.

10. The apparatus of claim 2 wherein:
said locking structure includes a middle flange for supporting the side structures of the locking structure.

11. The apparatus of claim 1 wherein:
said container includes a first pair of side structures;
said locking structure includes a first pair of side structures for sliding engagement with
said first pair of side structures of said container;
said container includes a second pair of side structures; and
said locking structure includes a second pair of side structures for sliding along said second pair of container side structures.

12. The apparatus of claim 11 wherein:
said locking structure includes a hole and a ramp; and
said dispensing structure includes a projection for bearing against said ramp and flexing said locking structure and for being received in said hole of said locking structure for securing said dispensing structure.

13. The apparatus of claim 12 wherein:
said locking structure is formed of flexible material.

14. The apparatus of claim 13 wherein:
said container includes a lateral structure having an upper wall; and
said locking structure includes a lateral flange for sliding adjacent said upper wall of said container lateral structure.

15. The apparatus of claim 14 wherein:

said container includes a projection;

said dispensing structure includes lateral flanges and an abutment surface; and said container includes an abutment surface for engaging said abutment surface of said dispensing structure when said dispensing structure is in the closed position.

16. The apparatus of claim 1 wherein:

said locking structure includes a hole and a ramp;

said dispensing structure includes a projection for bearing against said ramp and flexing said locking structure and for being received in said hole of said locking structure for securing said dispensing structure; and said locking structure is formed of flexible material.

17. The apparatus of claim 16 wherein:

said container includes a projection;

said dispensing structure includes guide flanges and an abutment surface; and said container includes an abutment surface for engaging said abutment surface of said dispensing structure when said dispensing structure is in the closed position.

18. The apparatus of claim 1 wherein:

said dispensing structure includes an abutment surface; and said container includes an abutment surface for engaging said abutment surface of said dispensing structure when said dispensing structure is in the closed position.

* * * * *